United States Patent

[11] 3,633,300

| [72] | Inventor | Julius Poizner<br>Downsview, Ontario, Canada |
|---|---|---|
| [21] | Appl. No. | 53,265 |
| [22] | Filed | July 8, 1970 |
| [45] | Patented | Jan. 11, 1972 |
| [73] | Assignee | Newark Tool & Machine Limited<br>Weston, Ontario, Canada |

[54] DRIVING MIRROR
7 Claims, 6 Drawing Figs.

| [52] | U.S. Cl. | 40/152 |
| [51] | Int. Cl. | G09f 1/12 |
| [50] | Field of Search | 40/10, 11, 152, 154, 156 |

[56] References Cited

UNITED STATES PATENTS

| 1,262,101 | 4/1918 | Sabatelli | 40/152 |
| 2,702,956 | 3/1955 | Silverman | 40/156 |
| 2,747,311 | 5/1956 | Fulmer | 40/156 |
| 2,890,539 | 6/1959 | Holt | 40/152 |

Primary Examiner—Robert W. Michell
Assistant Examiner—Wenceslao J. Contreras
Attorney—Rogers, Bereskin & Parr ABSTRACT: A driving mirror including an extruded support for gripping the longer edges of a rectangular mirror glass with the longer edges of the mirror glass extending longitudinally of the mirror. The support includes curved ribs for resiliently biasing the mirror outwardly against inner surfaces of front flanges to lock the mirror in place in the support. End caps are provided which are adapted to contain the mirror within the support and a tie rod extends through the caps for receiving nuts to hold the end caps in place on the support. Further nuts are provided for engaging on the ends of the tie rod to attach the mirror to a truck or the like.

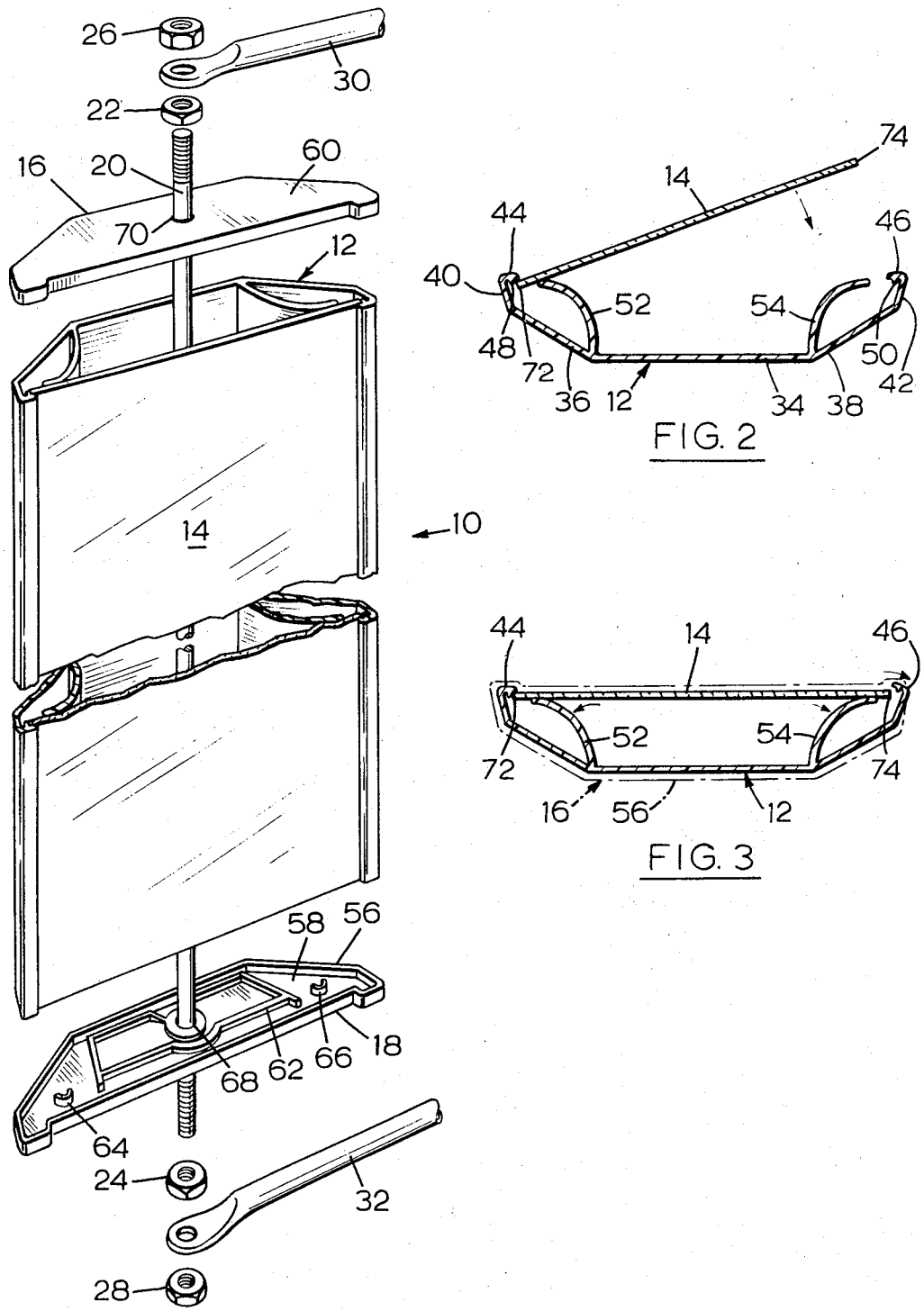

DRIVING MIRROR

This invention relates to a driving mirror for use on trucks and other vehicles.

Driving mirrors on trucks must necessarily be relatively large and are suspended from the truck cab so that the driver can see rearwardly along the sides of the truck. Because the mirrors overhang the truck somewhat, there is a tendency for the mirrors to be damaged in use by accidental collision with obstacles. If the mirror glass is broken, then usually the complete mirror must be replaced.

It is an object of the present invention to provide a driving mirror which is relatively resilient to withstand knocks, and which can be readily dismantled to replace the mirror glass should this glass be broken.

According to a particular preferred embodiment of the present invention, a driving mirror is provided which includes an extruded support for gripping the longer edges of the rectangular mirror glass with these edges extending longitudinally of the mirror. The support includes curved ribs for resiliently biasing the mirror outwardly against inner surfaces of front flanges to lock the mirror in place in the support. End caps are provided which are adapted to contain the mirror within the support and a tie rod extends through the caps for receiving nuts to hold the end caps in place on the support. The mirror is attached to a truck by inserting ends of the tie rod through respective first and second mirror support arms on the truck and then locking the mirror in place using further nuts.

The invention will be better understood with reference to the drawings, wherein:

FIG. 1 is an exploded perspective view of a driving mirror according to the invention.

FIGS. 2 and 3 are sectional views taken generally on lines 2—2 of FIG. 1 and illustrating the assembly of a mirror glass into a support.

Figure 4:
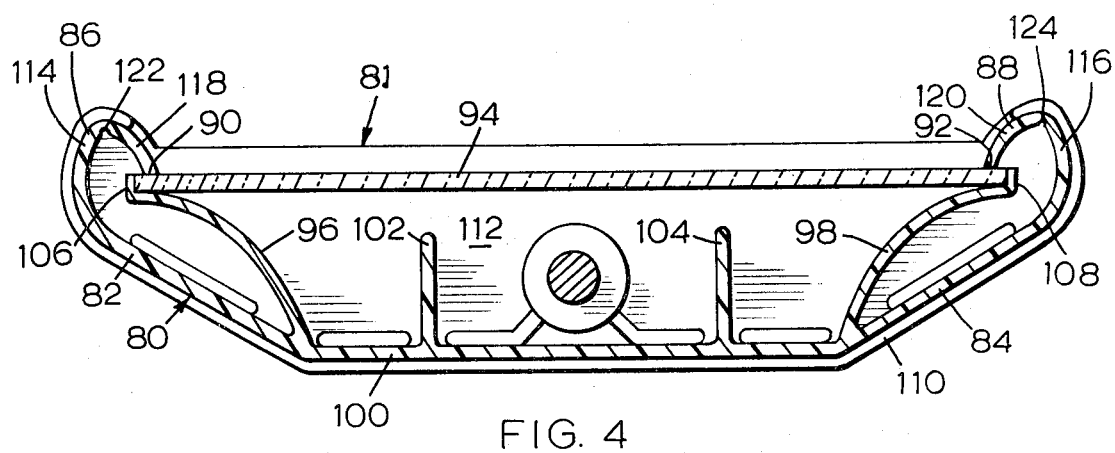
FIGS. 4-6 are sectional views of further embodiments of the invention.

Reference is first made to FIG. 1 which shows a driving mirror 10 having an extruded plastic support 12 which grips a mirror glass 14. The support 12 is of a relatively rigid polyvinylchloride (p.v.c.) and first and second end caps 16, 18 which are also of p.v.c. are adapted to engage on respective ends of the support 12 and mirror glass 14 to locate the glass 14 longitudinally in the support 12. A tie rod 20 is provided together with a first pair of nuts 22, 24 for drawing the caps into place in engagement with the support 12 and a further pair of nuts 26, 28 are provided for attaching the mirror 10 to respective first and second mirror support arms 30, 32. The arms form part of a truck or any other vehicle.

As better seen in FIG. 2, the extruded support 12 has a backwall 34 attached by its longitudinal sides to outwardly inclined intermediate walls 36, 38 which respectively meet sidewalls 40, 42. Coplanar front flanges 44, 46 are generally parallel with backwall 34 to overlap the front surface of mirror glass 14 thereby retaining the mirror glass 14 in the support 12 as will be explained. Relatively small longitudinally extending beads 48 and 50 extend inwardly and are dependent from respective front flanges 44, 46 for locating the mirror glass transversely of the support 10.

A pair of curved ribs 52, 54 extend inwardly from respective intersections between walls 36, 34 and 38, 34. The curved ribs diverge towards their distal ends and normally extend beyond the inner limitation of the beads 48, 50. Because of their shape, and the inherent resiliency of the material of the support, the ribs 52, 54 can be deflected to apply an outward force on the back of the mirror glass 14 for frictionally holding the mirror glass in the support 12 as will be described.

Returning now to FIG. 1, end cap 18 (which is typical of both end caps 16 and 18) has a peripheral flange 56 adapted to engage snugly about the corresponding ends of the support 12 and mirror glass 14 with an end of the support 10 and mirror glass 14 engaged against an inner wall 58 of the end cap 18. An outer surface of the end cap is similar to outer surface 60 of cap 16 and can have any necessary assembly instructions, trademarks, or the like molded on it. A network of ribs 62, 64 and 66 is provided on the inner surface 58 for strengthening the end cap 18, and are positioned to avoid interference with ends of the curved ribs 52, 54 when the cap is positioned in the support 12.

An opening 68 is provided in the end cap 18 and a similar opening 70 is provided in the end cap 16 for receiving the tie rod 20. The tie rod is threaded adjacent its ends for receiving respective nuts 22, 24 and 26, 28 to assemble the driving mirror and position it on the support arms 30, 32 as will be explained.

Reference is next made to FIGS. 2 and 3 to describe the method of assembling the mirror glass 14 in the support 12. As seen in FIG. 2, the glass 14 is first engaged on the curved rib 52 and entered under the front flange 44 to bring a longitudinal edge 72 of the glass 14 into engagement with the locating rib 48. Next, the glass is rotated towards the support 12 until it engages the front flange 46. Using moderate finger pressure, the flange 46 is deflected outwardly into the position shown in FIG. 3 to permit the glass to be pushed against the curved rib 54 thereby deflecting the rib and permitting the flange 46 to return to its original position in which the front flange 46 is engaged over the mirror glass 14 with the bead 50 engaged against a second longitudinal edge 74 of the glass 14. The end cap 16 is indicated in chain-dotted outline in FIG. 3 to indicate the relative position of the peripheral flange 56 of the end cap about the support 12 and mirror glass 14. Once in position, the mirror glass 14 is held in place by the curved ribs 52, 54 which exert an outward force on the glass to hold the glass securely in the support. The tie rod 20 is then slipped inside the support 12 behind the mirror glass 14 and the end caps 16, 18 are moved into position on the rod 20 and support 12. Nuts 22, 24 are next tightened and the mirror is ready for assembly on the truck.

If preferred, nuts can be provided on the rod 20 inside the caps to prevent overtightening of the nuts 22, 24 which would distort the end caps and possibly fracture the mirror glass.

Figure 5:
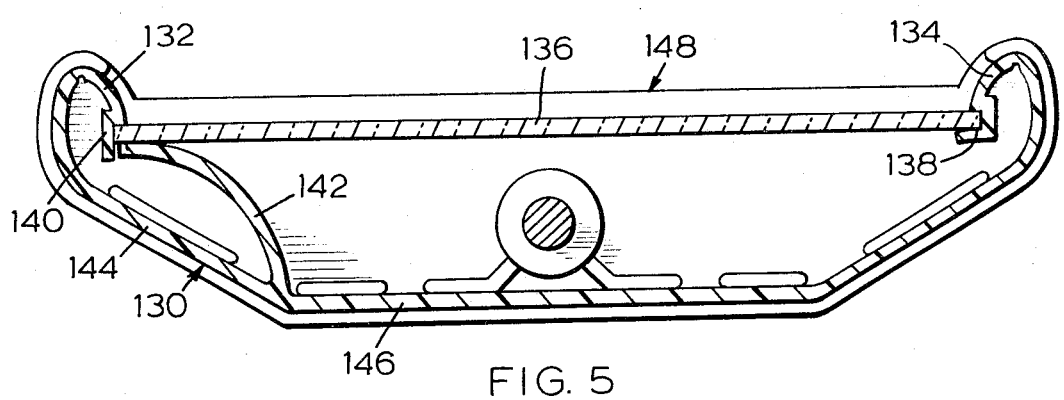
Figure 6:
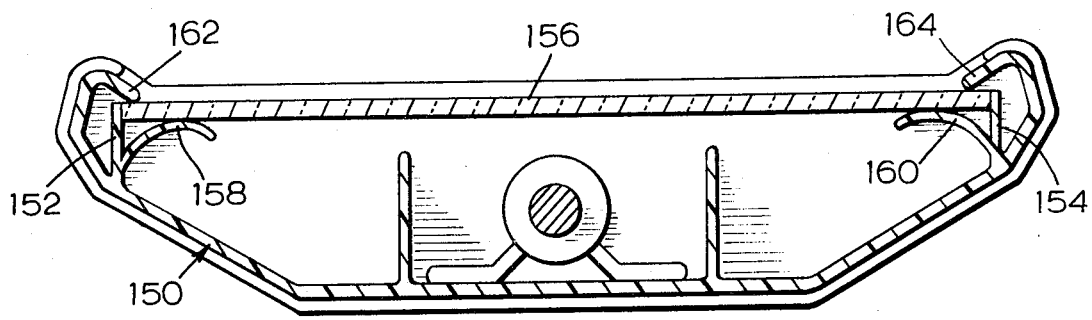

Further embodiments of the support 12 are shown in FIGS. 4 to 6. As seen in FIG. 4, a support 80 of p.v.c. is coupled to an end cap 81 and has intermediate walls 82, 84 terminating in respective curved end portions 86, 88. Respective ends 90, 92 of the portions 86, 88 are engaged against an outer face of a mirror glass 94 and because of the shape of the portions 86, 88 they are capable of absorbing moderate shock forces to protect the mirror glass 94. Curved ribs 96, 98 extend inwardly and diverge from a backwall 100 which also has strengthening ribs 102, 104 dependent from it. The ribs 96, 98 terminate in respective lips 106, 108 which are adapted to locate against the longitudinal edges of the mirror glass 94. Whereas the peripheral flange 56 of end cap 18 (FIG. 1) is continuous, a peripheral flange 110 is provided which engages about the support 80 but ends short of the mirror glass 94. An inner wall 112 of the cap 80 projects past mirror 94 to prevent longitudinal displacement of the mirror in the support 80.

Each of the curved portions 86, 88 includes respective outer parts 114, 116 which curve inwardly and forwardly to meet outer ends of inwardly extending inner parts 118, 120 at respective internal shallow grooves 122, 124. The grooves permit the parts 118, 120 to be pushed towards respective outer parts to insert and remove mirror glass 94.

The mirror glass 94 can be engaged in the support 80 after the end cap 81 (and the corresponding cap at the other end of the mirror) have been assembled on the support 80 because the peripheral flange 110 of cap 80 is discontinuous to provide access for mirror glass 94. The glass 94 is assembled by engaging one of its longitudinal edges against a corresponding one of the lips 106, 108 and rotating the mirror transversely to bring the other longitudinal edge into engagement with a corresponding one of the inner parts 118, 120 to deflect the part and snap the mirror glass into the position shown in FIG. 4. To remove a broken mirror glass 94, the glass is broken into smaller pieces and each piece pulled out. Thus a new mirror 94 can be installed without disassembling the support 80 and end caps 81 or removing the mirror off the vehicle.

Reference is next made to FIG. 5 which shows a somewhat similar structure to that described with reference to FIG. 4. However, a support 130 has curved portions 132 and 134 for resiliently supporting a mirror glass 136, the portion 134 terminating in a channel 138 for receiving an edge of the glass 136, and the portion 132 terminating in a lip 140 which locates against the edge of the glass 136. The portion 132 overlaps the glass 136 to retain it in place against a curved rib 142 which extends inwardly from the junction of an intermediate wall 144 and a backwall 146. To assemble this embodiment, the glass 136 is first engaged in the channel 138 and then the glass is rotated towards the support 130 to deflect the portion 132 and the curved rib 132 thereby snapping the glass into the position shown in FIG. 5. As with the embodiment shown in FIG. 4, the glass can be assembled in the support 130 after an end cap 148 is assembled on the support 130.

Reference is now made to FIG. 6 which shows yet a further embodiment of the invention. A support 150 has a pair of generally parallel ribs 152, 154 for locating against longitudinal edges of a mirror glass 156. Dependent curved ribs 158, 160 extend from the ribs 152, 154 to engage the back surface of the mirror glass 156 thereby biasing the mirror glass towards parts 162, 164 of the support 150. This embodiment an also receive the mirror glass 156 after assembly of the support end caps.

In general, any arrangement of resilient curved ribs or the like which will bias a mirror glass into a required position in the support will be acceptable. However, from an economic viewpoint it is preferable to manufacture the support from an extruded plastic such as rigid polyvinylchloride (p.v.c.). The end caps are preferably molded of the same material and can be of the same color or another color.

What I claim as my invention is:

1. A driving mirror for attachment to the exterior of a vehicle to enable a driver to see rearwardly of the vehicle, the mirror comprising:
    a. a mirror glass having front and back surfaces and substantially parallel longitudinal edges;
    b. a support positioning the mirror glass in the driving mirror, the support including: means overlapping said front surface of the mirror glass adjacent the longitudinal edges; and means engaging against said back surface to bias the mirror glass into frictional engagement with said overlap means whereby the mirror glass is located transversely of the support, the support being sufficiently resilient to permit the mirror glass to be placed in the support by first engaging one of said longitudinal edges under the overlap means and then snapping the other longitudinal edge under the overlap means, whereupon the support returns to substantially its original shape with the overlap means in engagement on said front surface; and
    c. means in engagement with the ends of the support and the mirror to locate the mirror glass longitudinally in the support.

2. A driving mirror as claimed in claim 1 in which the bias means comprises a curved rib attached to the support and extending outwardly beyond the overlap means before the mirror glass is engaged in the support, the curved rib being deflected by the mirror glass so that the rib applies an outward force on the mirror glass thereby forcing the mirror glass into frictional engagement with the overlap means.

3. A driving mirror as claimed in claim 2 in which the curved rib is one of a pair of curved ribs attached to the support, the ribs diverging outwardly into engagement with the mirror glass.

4. A driving mirror as claimed in claim 2 in which the support is an extrusion and in which the mirror glass is generally rectangular having longer sides extending longitudinally, the longer sides having a length substantially equal to the length of the support, and the curved rib extending longitudinally of the support and being curved transversely of the support.

5. A driving mirror as claimed in claim 4 in which the support is an extrusion and in which the mirror glass is generally rectangular having longer sides extending longitudinally, the longer sides having a length substantially equal to the length of the support, and the curved rib extending longitudinally of the support and being curved transversely of the support; and in which the locating means comprises: first and second end caps fitted over respective ends of the support and limiting longitudinal movement of the mirror glass relative to the support, the end caps defining respective first and second openings; a tie rod passing through said openings, the tie rod being substantially longer than the longitudinal extent of the support and having threaded end portions projecting outwardly of the end caps; and threaded fasteners engaged on the threaded end portions and drawing the end caps into relatively tight engagement with the support.

6. A driving mirror as claimed in claim 1 in which the support is an extrusion and in which the mirror glass is generally rectangular having longer sides extending longitudinally, the longer sides having a length substantially equal to the length of the support.

7. A driving mirror as claimed in claim 6 in which the locating means comprises: first and second end caps fitted over respective ends of the support and limiting longitudinal movement of the mirror glass relative to the support, the end caps defining respective first and second openings; a tie rod passing through said openings, the tie rod being substantially longer than the longitudinal extent of the support and having threaded end portions projecting outwardly of the end caps; and threaded fasteners engaged on the threaded end portions and drawing the end caps into relatively tight engagement with the support.

* * * * *